United States Patent

[11] 3,586,784

[72] Inventor Gurcharan S. Bhusri
Wayne, N.J.
[21] Appl. No. 814,983
[22] Filed Apr. 10, 1969
[45] Patented June 22, 1971
[73] Assignee International Telephone and Telegraph Corporation
Nutley, N.J.

[54] CROSS POINT SWITCHING ARRANGEMENT
27 Claims, 3 Drawing Figs.

[52] U.S. Cl. .......... 179/18
[51] Int. Cl. .......... H04q 3/42
[50] Field of Search .......... 178/18, 18.74

[56] References Cited

UNITED STATES PATENTS 3,319,009 5/1967 Regnier et al. .......... 179/18

*Primary Examiner*—Kathleen H. Claffy
*Assistant Examiner*—William A. Helvestine
*Attorneys*—C. Cornell Remsen, Jr., Walter J. Baum, Percy P. Lantzy, Philip M. Bolton, Isidore Togut and Charles L. Johnson ABSTRACT: An electronic cross-point-switching arrangement comprising a multistage switching array of semiconductor devices arranged in coordinate matrix form with array control-gating circuitry for effecting a complete path through the array at very high speeds. Selection and activation of cross-points is such as to involve only the minimum number of cross-points necessary to establish this connection. The control-gating circuitry permits simultaneous automatic searching of all available switching possibilities through the array and prevents the activation of any cross-point in a connection attempt when no idle paths exist. Fault indication circuitry is provided for the detection of cross-point failures, the output information therefrom being readily adaptable to permanent recording apparatus.

INVENTOR
GURCHARAN S. BHUSRI
BY [signature]
ATTORNEY

INVENTOR
GURCHARAN S. BHUSRI
BY [signature]
ATTORNEY

CROSS POINT SWITCHING ARRANGEMENT

BACKGROUND OF THE INVENTION

This invention relates to communications switching systems, and more particularly, to the arrangement and control of high-speed semiconductor cross-point-switching arrays and automatic detection of switching failures therein.

Semiconductor cross-point-switching arrangements for effecting transmission path connections between two terminal points or remote parties are well known in the art. Systems using four-layer semiconductors as cross-point devices have in general been shown to possess significant advantages over those systems employing conventional semiconductors and nonsolid-state devices in switching. The use of four-layer devices, however, is restricted by the problem of "fan-out," slow switching speeds, and complete dependence on the inherent rate-effect characteristics of the cross-point devices for switching. In addition, there is no reliable fault detection means incorporated within known semiconductor switching systems which would permit accurate determination of individual cross-points responsible for switching failures.

"Fan-out" may be eliminated by selecting specific cross-points in a connection attempt and activating or firing only those selected cross-points so as to leave all other switching possibilities, including busy paths, undisturbed. The patent application of Konidaris et al. entitled "Electronic Cross-Point Switching Array," Ser. No. 759,670, filed Sept. 13, 1968, performs switching in this manner and also eliminates the need for dependency on the rate-effect characteristics of the devices employed.

However, the Konidaris et al. application scans or searches the switching array a portion at a time in attempting to locate an idle path. The importance of reducing this search time factor becomes increasingly evident as the size consideration of the system, in terms of numbers of subscribers, grows large and the system traffic (number of switching possibilities occupied) is at a high percentage of the total system subscriber capacity.

SUMMARY OF THE INVENTION

It is therefore, an object of this invention to provide a reliable, high-speed multistage switching arrangement in which the search for idle paths is made of all available paths simultaneously in a connection attempt.

It is another object of this invention to permit detection of individual cross-point failures in attempting a connection.

It is a further object of this invention to provide a noncritical switching arrangement in which the aforementioned scanning and firing problems are eliminated by selecting and firing the minimum number of cross-points required for a complete connection to be established.

Yet another object of the invention is to provide a two-speed scanning arrangement wherein the scanning is at a high rate of speed in search of idle paths and automatically changes to a slower speed when an idle path has been located.

According to the broader aspects of the invention, there is provided a multistage switching array of four-layer semiconductor cross-points, array terminal circuitry including line/trunk circuits and link circuits coupled to the inputs and outputs of the switching array respectively, control-gating circuitry including primary and intermediate stage-gating circuitry coupled to the switching array, path selection control means including an array scanner and a main scanner coupled between the line/trunk circuits and the link circuits and coupled to the control-gating circuitry, and fault indication circuitry coupled to the switching array.

A feature of the invention is that it is capable of being employed to take advantage of the rate-effect characteristics of the array cross-points or operated in a manner completely independent of these characteristics. Moreover, the features of the array selection and marking technique lend themselves to other semiconductor types arranged in cross-point fashion and similar nonsemiconductor arrangements as well.

BRIEF DESCRIPTION OF THE DRAWINGS

The above mentioned and other objects and features of this invention will become more apparent and the invention itself best understood by reference to the following description taken in conjunction with the accompanying drawings comprising FIGS. 1—3 wherein.

DESCRIPTION OF THE PREFERRED EMBODIMENT

Figure 1:
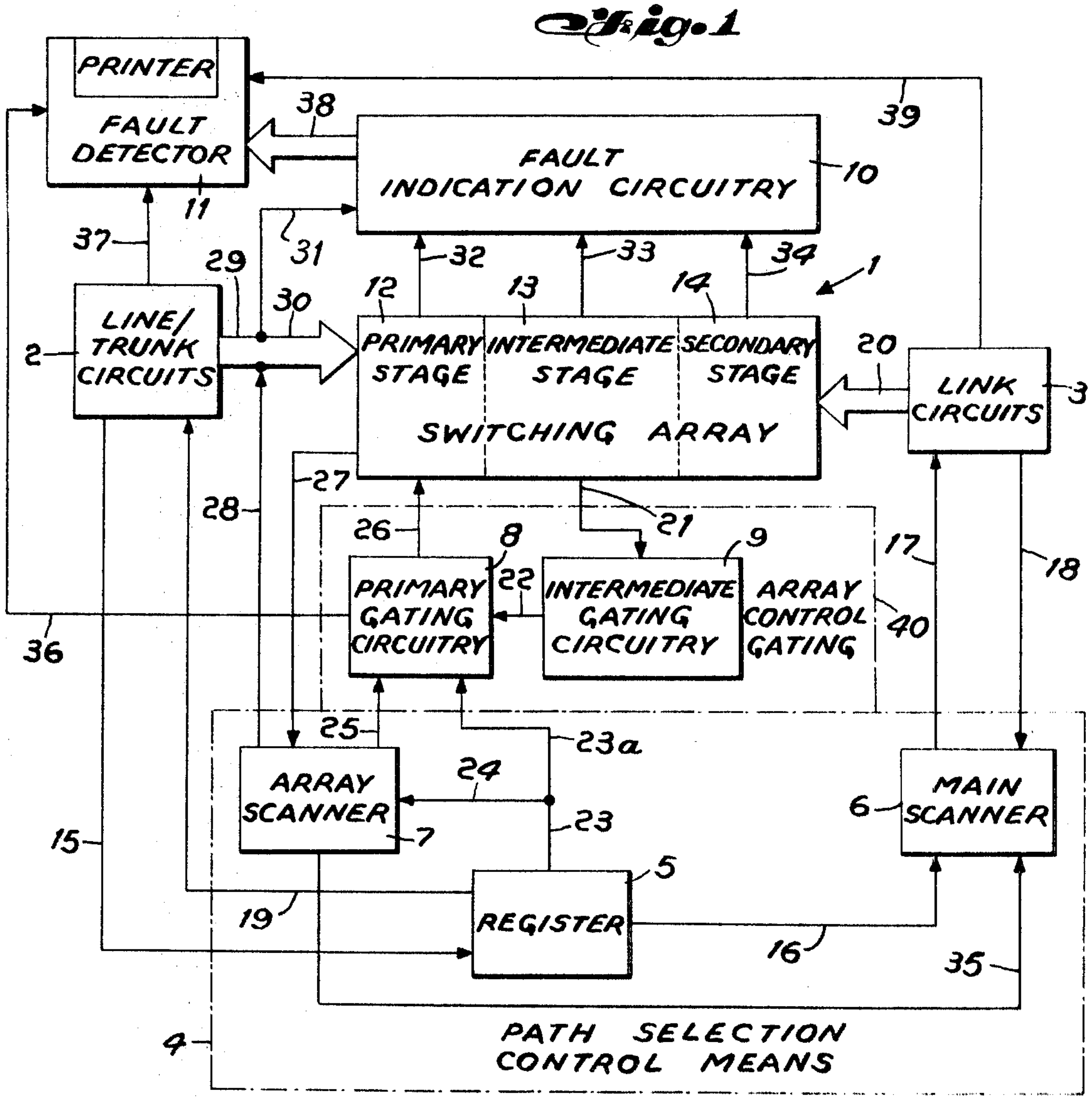
FIG. 1 is a block diagram of the portion of a communication switching system including the switching array, wherein there is illustrated the relationship of the switching array and associated circuitry.

Referring to FIG. 1, illustrated in block diagram form is the portion of a communications switching system comprising the invention and pertinent support circuitry. Such a system may be, for instance, employed in telephone communications, and for the purposes of example, will be described with reference thereto.

If a two-wire system is employed, both the outgoing connection from the calling party to the called party and the return connection from the called party to the originator are made through the same switching array 1. In a four-wire system, however, it is desirable to use a separate transmit and receive array-switching arrangement. It is to be noted that a connection through the switching array according to the invention is achieved in the same manner in either the two-wire or four-wire arrangement and therefore only the two-wire arrangement will be considered.

When the central control of the switching system is commanded by a subscriber to connect the calling line with the desired line, there follows an attempt, assuming that an idle path exists, to have the originating line/trunk, via its line/trunk circuit 2, connected to one side of the link circuit 3 chosen by the system, and the called line/trunk circuit 2 connected to the other side of the link 3, with the link completing the speech path. Inasmuch as the switching from the called party to the link is essentially the same as switching from the originating (calling) line to the link, only the latter will be hereinafter described in detail.

In establishing the desired connection the request for service is detected by the central control, a portion of which is illustrated in FIG. 1 as path selection control means 4. The calling line/trunk is identified by a register 5 which has been selected by the central control to handle this communication, with the identification being made over line 19. The selected register 5 receives the digits identifying the called party over line 15. The register 5 by way of line 16 commands the main scanner 6 to scan and find an idle link circuit 3, with the main scanner 6 complying via line 17. When an idle link 3 is located, that link in turn requests the main scanner 6 by way of line 18 to lengthen its time slot.

For the duration of the lengthened time slot, the link 3 allots the switching array outlet to which it is associated with a slow-rising, positive-going pulse over line 20. This voltage is fed through the secondary stage 14 of the switching array 1 to the intermediate stage 13 thereof and simultaneously to the array control-gating 40, and more specifically the intermediate gating circuitry 9 thereof by way of line 21, if the intermediate section contains one or more idle paths. With this input present, an output is transmitted from the intermediate gating circuitry 9 via line 22 to the primary gating circuitry 8 of the array control-gating 40. The signal received from line 22 is one of three signals required by primary gating circuitry 8 to define that part of the primary stage 12 to be part of the attempted connection through the array. Once defined the particular primary gating circuit 8 initiates the firing sequence, beginning with the correspondingly defined primary section cross-point, to achieve the desired complete connection from the line/trunk 2 desiring service to the selected link 3.

Along with the command to the main scanner 6 to locate an idle link 3, the selected register 5 generates a function called "group control." The group control signal provides the second of the three required signals to the primary gating circuitry 8, and is coupled thereto by way of lines 23 and 23*a*. The group control signal is also coupled across line 24 to the array scanner 7, which operates with the system's main scanner 6 on an interlocking basis. The group control signal activates the array scanner 7 to search the various gating circuits of the primary gating circuitry 8 through line 25 with well-defined, comparatively short time slots. The array scanner time slot to each primary gating circuit 8 represents the third primary gating circuitry input required. A particular primary gating circuit 8 when receiving its time slot over line 25, and possessing at that time the other two required signal inputs as well, generates in response thereto a positive-going output to the primary stage 12 across line 26. This results in the function "-busy check" being generated, and transmitted via line 27, to the array scanner 7. The busy check signal instructs the array scanner 7 to lengthen the time slot of the particular primary gating circuit defined (selected) by the three inputs. The interlocking nature of operation between the array scanner 7 and the system's main scanner 6 is derived from the fact that the array scanner 7 generates a signal across line 35 to the main scanner 6 whenever a signal is received on line 27 indicating that a primary gating circuit 8 and an available primary stage cross-point have been located. By this signal on line 35, the array scanner 7 inhibits the main scanner 6 from advancing to the next link's time slot for a time period more than sufficient for the desired communication path through the array 1, to be completed.

During the lengthened time slot of the selected primary gating circuit 8, the array scanner 7 marks the calling line 29 with a firing pulse of short duration and negative polarity. This marking or firing pulse is identified as "pulse matrix enable," and is transmitted to the calling line 29 via line 28. The combination of the particular calling line/trunk circuit 2 and the defined primary gating circuit 8 define a single primary cross-point through which the connection in the primary stage 12 will pass. With the marking or firing pulse applied to the defined primary cross-point across line 30 there is sufficient potential difference thereacross to activate (fire) it into its high conductivity state.

With the primary stage cross-point defined and activated, the selected link circuit 3 and its corresponding secondary stage outlet are all that is additionally required to exactly define the particular cross-point to be activated in the intermediate stage 13 and in the secondary stage 14 to complete the connection. The firing of the selected primary stage cross-point provides sufficient potential conditions across the defined intermediate stage cross-point to activate it. Firing of the intermediate stage cross-point in turn fires the defined secondary stage cross-point, thus completing the communication path between the calling line/trunk circuit 2 and the selected link 3. This connection was effected by selecting and activating the absolute minimum number of cross-points required to complete it, in this case three cross-points, one from each stage of the array.

Fault indication circuitry 10 is provided for the purpose of determining the existence and location of malfunctions. The pulse matrix enable signal (PME) transmitted to the primary stage 12 by lines 28 and 30 to initiate firing is also transmitted simultaneously across line 31 to the fault indication circuitry 10, as a priming signal thereto. As the selected cross-point of each stage is fired, it is sensed by individual fault indication circuits 10 respectively assigned to the array stages. The sensed firings are formed into signals and combined with the priming signal from line 31 to provide individual outputs across line 38. These outputs 38 are readily adaptable to automatic processing to determine exactly which of the three cross-points are involved in the connection attempt and of those three which one is responsible for the failure to achieve connection if a malfunction occurs. The addition of a printer would provide an easy means to obtain a permanent record of each connection attempt, and the results thereof.

The information as to the identity of the calling line 2 (primary stage inlet) and the selected primary gating circuit 8 (primary stage outlet), as well as the information as to which link/circuit 3 (secondary outlet) was selected, defines completely the three cross-points in the switching path through which a connection attempt is to be made. Applying this information to a fault detector 11, coupled with the information received from the fault indication circuitry 10 via line 38, leads to the automatic determination of the identity of the particular faulty cross-point(s) in the event that malfunction occurred. With each connection attempt there results a new record, the inevitable result being an ever-expanding and accurate determination of the status of each cross-point and possible path in the entire array. In this manner, each connection attempt further updates the records permitting thereby a reduction in maintenance problems to a minimum.

The sensed firing of the selected cross-point of each array stage is transmitted to the fault indication circuitry 10 by lines 32—34 respectively. As described, the primary stage inlet and outlet as well as the secondary stage outlet completely define the cross-points through which a connection attempt is to be made. The primary stage inlet (line/trunk circuit 2) identification is transmitted to the fault detector 11 over line 37. The indentity of the primary stage outlet (the particular primary gating circuit 8 selected) is received by the fault detector over line 36. Lastly, the identity of the secondary stage outlet (selected link circuit 3) is received by the fault detector 11 over line 39.

Figure 2:
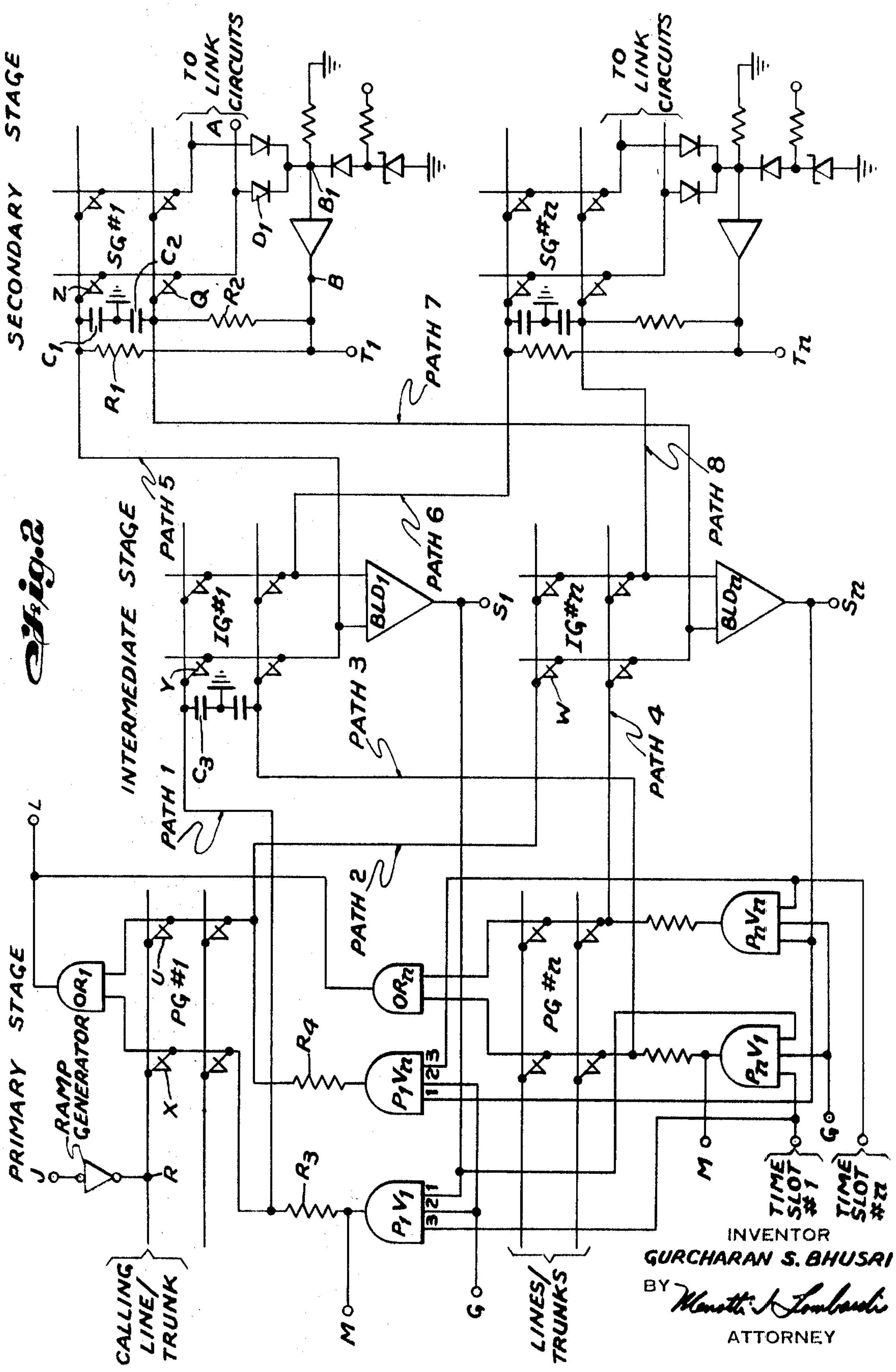
FIG. 2 is a schematic diagram illustrating the switching array together with the associated control-gating circuitry.

Referring now to FIG. 2, there is schematically illustrated the switching array 1 with the primary and intermediate gating circuitry (8 and 9 of FIG. 1) included according to the invention. The semiconductor cross-point devices are arranged in coordinate matrix groups, wherein the individual cross-points form vertical and horizontal rows. Each cross-point belonging to a vertical row has the same polarity electrode commonly connected. Similarly, each horizontal row has the cross-points belonging thereto commonly connected via a second polarity electrode. The vertical rows of a particular stage, or verticals as they are hereinafter referred to, constitute the various outlets of that stage. The horizontal rows or horizontals constitute the various inlets to a stage. The inlets or horizontals to the primary stage as indicated lead to and terminate in the line/trunk circuits. Similarly, the verticals of the secondary stage represent the connections to the various link circuits 3 respectively associated therewith.

There may be any finite number of groups (coordinate matrix groups) belonging to each stage with the usual arrangement being such that the number of groups of the intermediate stage equals the number of outlets of each primary group and also equals the number of inlets to each secondary group. The invention is not restricted to having like numbers of verticals and horizontals in a group although such is often desired in the primary and secondary stages. The intermediate stage, on the other hand, is frequently designed with more inlets than outlets and is in such a case known as a concentrator stage. The illustration in FIG. 2 shows, for the purposes of example, square matrix groups in each stage, with four cross-points belonging to each (2×2 matrix). It is to be noted that the two cross-points in any row represent the first and the last cross-points in actuality, with the others not shown for simplicity and clarity.

Each of the stages are interconnected by transmission paths, paths 1—4 and paths 5—8, wherein each vertical of a stage (excluding the secondary stage) is connected to a separate horizontal of the succeeding stage. There is at least one interconnection or path between a coordinate matrix group of a stage and each group of the succeeding stage. The interconnections in FIG. 2 are such as to have the first vertical of a group interconnected to the first succeeding stage, and so on, with the last vertical of that group interconnected to the last group of the succeeding stage. This arrangement is mainly for convenience, and the invention does not, therefore, require such a restriction.

The invention provides for additional intermediate stages in large systems though only one intermediate stage is illustrated. Others may be added to the array in a similar manner.

The intermediate gating circuitry consists of separate and identical gating circuits called blocking detectors ($BLD_1$—$BLD_n$), one of which is associated with each intermediate coordinate matrix group (IG01—IG0*n*). The verticals of an intermediate group constitute the inputs to the corresponding blocking detector. The intermediate gating circuits each have a single output which is fed to the primary gating circuitry (as illustrated in FIG. 1 by line 22).

Referring to the primary stage, the primary gating circuitry comprises AND-gating circuits, one of which is associated with each vertical in each group ($P_1V_1$—$P_nV_n$). In addition, the primary gating circuitry includes OR-gating circuits ($OR_1$—$OR_n$), one of which is associated with each primary group, wherein all verticals of a group constitute the inputs to the OR-gating circuit associated therewith. These two general groups of gating circuits were collectively identified as primary gating circuitry 8 in FIG. 1.

Note that the outputs of all primary OR-gating circuits are connected together. It is because of this that activation of any primary AND-gating circuit results in the function "busy check" being generated.

The arrangement of the primary stage AND-gate circuits, as previously described, is such as to require three inputs to a circuit to activate it. The first input originates from the intermediate gating circuitry. As shown in FIG. 2, each individual intermediate gating circuit (blocking detector) is connected to the first input of each of the primary AND-gating circuits associated with the same-numbered vertical row in each primary group. That is, those AND-gating circuits, associated with the primary group vertical rows having the same number, all have a common first input in the form of an output from one of the intermediate stage blocking detectors. The primary AND-gating circuit inputs labeled 3 are the respective time slot signals from the array scanner. These inputs are of the same orientation as the first inputs above described; that is, there exists a separate and distinct time slot signal input commonly fed to those primary AND-gating circuits associated with the same-numbered primary group verticals. Thus, for example, primary AND-gating circuits $P_1V_1$...$P_nV_1$each belong to the first vertical row of their respective primary coordinate matrix group (PG01...PG0n), and correspondingly share the same time slot signal (time slot 01) and intermediate stage blocking detector ($BLD_1$) output.

The AND-gating circuit input designated 2 in the figure is the function "group control." There is provided at points G a group control signal input for each primary group, and each individual input is, as shown, common to the AND-gating circuits of that particular group. In a connection attempt the group control signal to be generated is determined by the identity of the calling party's line, which, of course, corresponds to the primary coordinate matrix group to which the calling party is associated (i.e. the primary inlet requesting service).

In describing the operation of the invention in accordance with FIG. 2, it is to be assumed that a request for service has been made and that the main scanner (6 of FIG. 1) has located an idle link circuit. It is further assumed that the selected link circuit has instructed the main scanner to lengthen its time slot as hereinbefore described. For convenience, the secondary stage outlet to which this link is associated has been chosen as the first vertical of the first secondary coordinate matrix group (SG01), as defined by the point marked A. Similarly, the primary stage inlet associated with the originating party (calling line/trunk) has been chosen as the first horizontal of the first primary coordinate matrix group (PG01), as defined by the point marked R. It is to be understood that the choices above could have been any other primary horizontal and secondary vertical.

For the duration of the lengthened time slot, the chosen link allots its corresponding secondary outlet with a positive-going and relatively slow-rising voltage. This pulse appearing at point A is fed through diode D1 to the point B1 and is amplified to an output of +V volts at point B. The capacitors C1 and C2, coupled to the horizontals of the first secondary group SG01, are charged to +V respectively through resistors R1 and R2, provided those horizontals are idle. If any particular horizontals were busy, the busy path would present an extremely small impedance compared to the associated resistors (R1 or R2), and the voltage across the corresponding capacitor would not rise. The voltage appearing at point A is also applied to the common electrode of the cross-points of the first vertical row, including the cross-point marked Z.

Assuming that the paths are idle, the voltage +V now on the horizontals of secondary group SG01 is fed to the intermediate stage over paths 5 and 7. Path 5 terminates in the first vertical of the first intermediate coordinate matrix group IG01 and also leads to one input to the intermediate gating circuit $BLD_1$associated therewith. The +V voltage is therefore applied to the common electrode of the cross-points of this first vertical row, including the cross-point marked Y. The blocking detector $BLD_1$is a high impedance input network, and it generates an output, if and only if, at least one of the verticals associated with its inputs is idle. For the present path 5 has been assumed to be idle, and therefore the +V voltage at the corresponding input to $BLD_1$results in an output of +V being generated therefrom.

This +V output is applied to the common input to the primary stage AND-gating circuits belonging to the first verticals rows, priming same with the first of the three required inputs. The output of blocking detector $BLD_1$, therefore, contains the information as to whether an idle path through the particular intermediate stage exists or not. This information is used by the primary stage AND-gating circuitry in selecting a primary stage crosspoint, the firing of which guarantees the availability of an idle intermediate cross-point for the desired connection from point R of the calling line to the link terminal marked A.

The information as to which primary group from which the switching must start is derived from the calling party's line circuit, which is connected to one inlet of that primary group. The register selected by the central control to handle the request for service, upon learning the identity of the particular calling line circuit, causes to be generated the function "group control" to that particular primary group. This signal is received at the point marked G and, as previously outlined, provides the second required input. In this case, all AND-gating circuits of the first primary group PG01 receive this signal. As a result, there is defined by these first two required signals only one primary AND-gating circuit which has two inputs primed. This AND-gating circuit is $P_1V_1$of the first vertical of the first primary group.

The group control signal, being fed simultaneously to the array scanner, starts the array scanner searching the primary AND-gating circuits. The search output of the array scanner is the series of time slot signals, corresponding to the common time slot inputs of the AND-gating circuits of all like-numbered primary vertical rows. When the array scanner reaches the time slot input marked time slot 01 all AND-gating circuits belonging to a first vertical row receive this time slot signal. The matrix scanner has as many time slots as the number of outlets or verticals of the primary stage.

Considering $P_1V_1$, all of the required inputs are now present as a result, and it is activated for a time period of short duration. The period of firing is dependent upon the duration of the input of shortest time length. According to the invention, the time slot input from the array scanner is the input of shortest duration, being considerably shorter than either the group control signal or the +V input from $BLD_1$, which of course, depends from the time slot allotted to the selected link from the main scanner. Assuming that the vertical to which AND-gate $P_1V_1$is connected is idle, the output of +V volts passes through resistor $R_3$to the commonly connected electrodes of the cross-points belonging to that vertical.

In addition, the +V is fed to the OR-GATING circuit $OR_1$associated with group PG01 causing in response thereto the function "busy check" to be generated. The +V output of AND-gate $P_1V_1$is also supplied by way of path 1 to capacitor $C_3$charging same to that value. This +V voltage is applied at the same time to the commonly connected terminals of the first horizontal of intermediate group IG01. Capacitor $C_3$charges up at a relatively slow rate, so as not to disturb the present state of the cross-points belonging to this first horizontal row.

The busy check signal, in being transmitted to the array scanner (line 27 of FIG. 1), commands this scanner to lengthen the time slot of $P_1V_1$. The interlocking arrangement of the array scanner and the main scanner causes the latter to lengthen the selected link+s time slot. As a result, the time slots of the selected link and the activated AND-gate $P_1V_1$are substantially the same. This extended time length is more than sufficient to permit a complete connection to take place.

Approximately halfway through the extended time, the array scanner generates the pulse matrix enable command signal (PME) which is received by the switching array at point J of FIG. 2. The PME command signal is of short duration and is fed to a ramp generator amplifier associated with the particular calling line. The resultant output of the ramp generator appears as a negative-going ramp, and is applied to the corresponding inlet of the primary group.

By virtue of the origin of the request for service (calling inlet) and the selection of $P_1V_1$, there is defined one and only one cross-point in the entire primary stage through which the first attempt at connection will pass, that cross-point being the one marked X. This is so, as no primary stage cross-point except cross-point X possesses the necessary conditions at its terminals for activation into the high conductivity state. Being that the vertical-associated terminal of cross-point X has a +V voltage applied thereto, the application of the negative-going ramp generator output to the horizontal-associated terminal of X satisfies the firing characteristics of that cross-point and sends it into the high-conductivity state.

This results in a substantial variation (decrease) in voltage on the first vertical of PG01 and correspondingly path 1. The variation is of a high rate which first rapidly discharges capacitor $C_3$and then charges it in the reverse direction. This variation on the one terminal of cross-point Y coupled with the +V on the other terminal thereof, satisfies the firing characteristics of that cross-point and it is activated into the high-conductivity state. Similarly, the firing of cross-point Y is transmitted to cross-point Z via path 5 and the resultant high rate of voltage variation fires Z, thus completing the communications path through the array, this path running from line/trunk 01, through cross-points X, Y, and Z to the selected link termination at point A.

Though the voltage variation is sufficient to activate the defined cross-points it does so only because of the presence of the +V priming voltage at one terminal and the rapidly decreasing voltage on the other. It is because of this that no cross-points other than the ones defined by the point R, the point A, and the selected AND-gate $P_1V_1$can be activated. The output of the primary and intermediate stage cross-points when firing can be reasonably controlled to any rate by the RC networks associated with paths 1 and 5 ($R_3C_3$and $R_1C_1$), since the fan-out problems no longer exist. The switching which started with cross-point X yields a complete connection through the array in a few microseconds.

Assuming now that the first vertical in the primary group is busy, the connection of cross-points X, Y, and Z could not occur, as the busy path would prevent capacitor $C_3$from charging up to +V. No +V voltage would then be applied to the cross-points of the corresponding primary vertical and the associated OR-gate OR 1 from $P_1V_1$. There would follow no "-busy check" function generated and the array scanner would, therefore, not be commanded to extend the time slot to the first vertical. Thus, at the end of the normal (short duration) time slot to the first vertical, which is in the order of one-hundredth of the extended time slot duration, the array scanner moves on to the next primary vertical time slot. Assuming that the next time slot is time slot 02, the primary AND-gate circuits effected would be $P_1$ $V_1$...$P_nV_2$. Even if the first vertical of PG01 were idle, and time slot 01 was present at input 3, $P_1V_1$would not fire if input 1 thereof were missing, the indication that no idle path exists in the corresponding intermediate group (IG01), and in this case also the array scanner would consequently move on to the next time slot.

Each time slot and corresponding vertical row is interrogated in a similar manner until an idle path is formed. Eventually, the array scanner comes to the $n^{th}$time slot if all others proceeding it failed to locate an idle path. Assuming this to be the case, AND-gate $P_1V_n$would then receive its third input. Recalling that the firing of a primary cross-point guarantees that an idle path exists in the intermediate stage, this is so because the first required input of a primary AND-gate circuit must come from an intermediate stage-blocking detector, which generates an output if and only if an idle path in that intermediate group exists. In accordance with this, $P_1V_n$, and consequently cross-point U, could fire only if input 1 of $P_1V_r$-were supplied from $BLD_n$. Recalling also that the +V at point B was applied to both paths 5 and 7 at the same time, if the first vertical in IG0n were idle, the +V from path 7 would produce an output from $BLD_n$, and $P_1V_n$ would then be sufficiently primed in the same instant that $P_1V_1$was primed as described above. The resultant communication path through the array would include the cross-points U, W, and Q.

If no connection attempt were successful, that is, if all of the outputs of the primary group were scanned with no connection resulting, the matrix scanner in such a case requests the main scanner to advance to the next link (link time slot), and the process as described above would then be repeated.

The scanning time to locate a satisfactory path through the array, according to the invention, is greatly reduced in comparison to that which would be required if the technique of fast scanning for finding an idle path, and slowing the array scanner when that path has been found, were not employed.

In four-wire systems, where there are separate send and receive arrays as previously indicated, the array scanner is comprised of two scanners with a common synchronizing control. This arrangement works in a manner similar to that described above. An available outlet in the send array primary stage is found and the array scanner associated with the send array stops there. Immediately thereafter, an available primary outlet in the receive array is located and the array scanner associated therewith stops at that point. A pulse matrix enable signal is then sent to the line and switching in the send and receive arrays takes place at about the same time.

Figure 3:
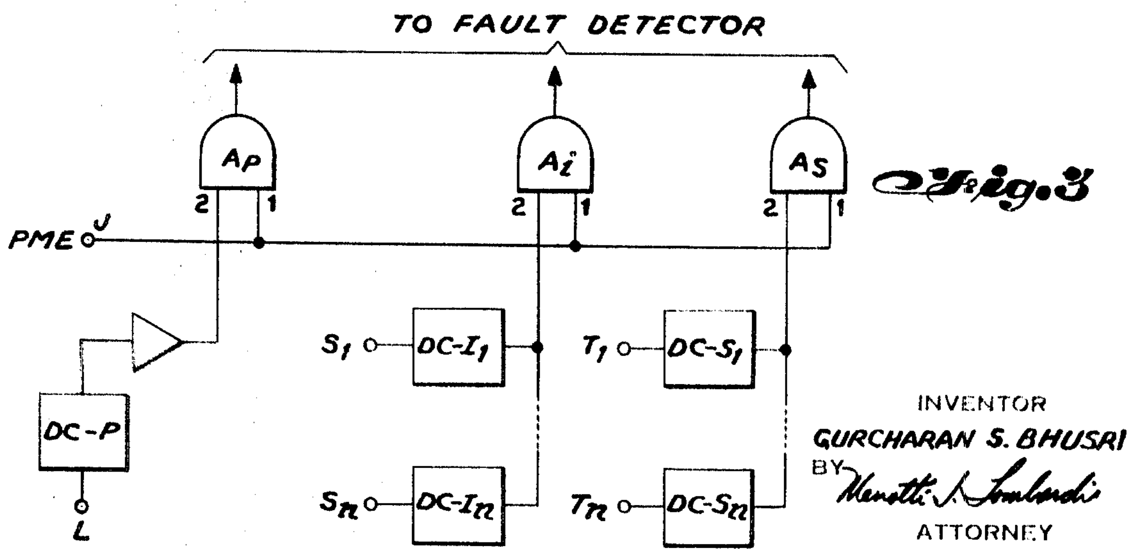
FIG. 3 is a schematic diagram illustrating the fault indication circuitry.

Referring now to FIG. 3, fault-indicating circuitry is illustrated according to the invention. The fault-indicating circuitry is comprised of gating circuitry and differentiator circuitry. The gating circuitry includes a separate and identical check AND-gate circuit associated with each switching array stage. Accompanying each individual check AND-gate circuit is a differentiator circuit arrangement coupled between the respective check AND-gate and corresponding stage of the array. The check AND-gate circuits have a common first input in the pulse matrix enable signal (PME) which is generated by the array scanner.

The specific arrangement for the primary stage involves differentiator circuit DC-P and primary check AND-gate $A_p$, with the input to DC-P coupled to the busy check output at point L of FIG. 2, and the DC-P output coupled to the second input of $A_p$through an amplifier. The specific fault-determining circuitry arrangements associated with the intermediate and secondary stages are essentially the same. The intermediate stage arrangement includes a separate and identical differentiator circuit (DC-$I_1$... DC-$I_n$) associated with each blocking detector ($BLD_1$BLD—n) output, indicated as points $S_1$—$S_n$in FIGS. 2 and 3. The outputs of DC-$I_1$...DC-$I_n$are commonly connected to the intermediate check AND-gate $A_i$at the second input thereof. Similarly, secondary stage differentiator circuits DC-$S_1$...DC-$S_n$receive inputs respectively from points $T_1$—$T_n$as illustrated in FIGS. 2 and 3. The common output of the differentiator circuits DC-$S_1$...DC-$S_n$is applied to the secondary check AND-gate $A_s$ at input 2 thereof. The single outputs from each check AND-gate are collectively represented in FIG. 1 as line 38.

As described hereinbefore, the generation of the pulse matrix enable signal (PME) by the array scanner is rapidly followed by the firing of the selected cross-points. Though the PME signal is quite short in duration, it is sufficiently long to allow completion of the firing sequence. Thus, when the PME signal is applied to the check AND-gate inputs marked 1, this priming signal remains long enough for the differentiator circuitry to sense the activation of the selected cross-points and for the resulting pulse outputs to be received at the respective check AND-gate second inputs, assuming of course that no cross-points malfunctioned.

The firing of the selected primary cross-point creates a voltage change, (resulting from the impedance change), at point L which is sensed by differentiator circuit DC-P. This differentiator circuit immediately generates in response thereto a pulse output which is received at input 2 of $A_p$after having been amplified. This signal, coupled with the PME signal at input 1, activates $A_p$, with the resultant output therefrom indicating that there is connection through the primary stage.

There is no substantial difference in function with regard to the intermediate and secondary stages. The differentiator circuit belonging to the coordinate matrix group of the the selected cross-point in these stages senses the change in voltage created when that device fires. If the selected cross-point fired in either stage, this information would be transmitted by way of the common differentiator circuit output to the respective check AND-gate, with the appropriate output therefrom occurring. If all check AND-gates generate an output in a connection attempt, the conclusion to be drawn therefrom is that the desired complete connection was established as between points R and A of FIG. 2 for instance. Should any one of the three outputs be a absent this indicates that cross-point malfunction has occurred and the attempted complete connection failed.

I claim:

1. A crosspoint-switching arrangement comprising:

a. array terminal circuitry including line/trunk circuits and link circuits;

b. a switching array of semiconductor cross-points said line/truck circuits and link circuits, said path said line/trunk circuits and link circuits, said switching array including a primary stage, a secondary stage, and at least one intermediate stage;

c. path selection control means coupled between said path selection control means including an array scanner;

d. array control gating means including primary stage-gating circuitry coupled to said switching array and to said path selection control means, and intermediate stage-gating circuitry coupled to said switching array and to said primary stage-gating circuitry, wherein said primary gating circuitry includes a separate AND-gate circuit operatively connected to each vertical row of said cross-points within said primary stage; and e. an input source to said array terminal circuitry means causing in response thereto said path selection control means to establish in said switching array by way of said array control-gating means a complete path by selecting and energizing the minimum number of array cross-points required to complete a connection between said line/trunk circuits and link circuits.

2. A crosspoint-switching arrangement comprising:

a. array terminal circuitry including line/trunk circuits and link circuits;

b. a switching array of semiconductor cross-points coupled between said line/trunk circuits and link circuits, said switching array including a primary stage, a secondary stage, and at least one intermediate stage;

c. path selection control means coupled between said line/trunk circuits and link circuits, said path selection control means including an array scanner;

d. array control-gating means including primary stage-gating circuitry coupled to said switching array and to said path selection control means, and intermediate stage circuitry coupled to said switching array and to said primary stage-gating circuitry, said intermediate stage-gating circuitry including a separate and identical blocking detector network associated with each coordinate matrix group subdivision of said intermediate stage; and e. an input source to said array terminal circuitry means causing in response thereto said path selection control means to establish in said switching array by way of said array control-gating means a complete path by selecting and energizing the minimum number of array cross-points required to complete a connection between said line/trunk circuits and link circuits.

3. A crosspoint-switching arrangement comprising:

a. array terminal circuitry including line/trunk circuits and link circuits;

b. a switching array of semiconductor cross-points coupled between said line/trunk circuits and link circuits, said switching array including a primary stage, a secondary stage, and at least one intermediate stage;

c. path selection control means coupled between said line/trunk circuits and link circuits, said path selection control means including an array scanner;

d. array control-gating means coupled to said path selection control means and said switching array;

e. an input source to said array terminal circuitry means causing in response thereto said path selection control means to establish in said switching array by way of said array control-gating means a complete path by selecting and energizing the minimum number of array cross-points required to complete a connection between said line/trunk circuits and link circuits; and f. fault-determining means including fault indication circuitry coupled to said switching array and to said path selection control means, and fault detector means coupled to said array terminal circuitry, to said array control-gating means and to said fault indication circuitry, for determining cross-point failure in response to an initiating signal from said path selection control means.

4. A crosspoint-switching arrangement according to claim 3 wherein said array control-gating means include primary stage-gating circuitry coupled to said switching array and to said path selection control means, and intermediate stage-gating circuitry coupled to said switching array and to said primary stage-gating circuitry.

5. A crosspoint-switching arrangement according to claim 3 wherein said switching array may include separate transmit and receive arrays, each having a primary stage, a secondary stage, and at least one intermediate stage.

6. A crosspoint-switching arrangement according to claim 3 wherein each stage is subdivided into a plurality of coordinate matrix groups with the cross-points thereof being interconnected in vertical and horizontal rows and wherein each cross-point has the same functional electrode associated with a vertical row and a second functional electrode associated with a horizontal row.

7. A crosspoint-switching arrangement according to claim 6 wherein each vertical row of an array stage is connected to a horizontal row belonging to the adjacent and succeeding stage such that each coordinate matrix group of said array stage has at least one interconnection with each coordinate matrix group of said adjacent and succeeding stage.

8. A crosspoint-switching arrangement according to claim 7 wherein the horizontal rows of said primary array stage represent the inputs to said switching array and wherein the vertical rows of said secondary array stage represent the outputs of said switching array.

9. A crosspoint-switching arrangement according to claim 4 wherein said primary stage-gating circuitry includes separate and identical gating circuitry associated with each coordinate matrix group within said primary stage.

10. A crosspoint-switching arrangement according to claim 9 wherein said separate and identical gating circuitry includes AND-gating circuitry in which a separate and identical AND-gated circuit is operatively connected to each vertical row of said coordinate matrix group.

11. A crosspoint-switching arrangement according to claim 10 wherein the AND-gated circuits associated with like-numbered vertical rows have at least one common input.

12. A crosspoint-switching arrangement according to claim 11 wherein said AND-gated circuits associated with like-numbered primary stage vertical rows have a common time slot input such that each set of like-numbered vertical rows has a different time slot input.

13. A crosspoint-switching arrangement according to claim 10 wherein the AND-gated circuits associated with a coordinate matrix group have a common input.

14. A crosspoint-switching arrangement according to claim 9 wherein said separate and identical gating circuitry further includes busy check OR-gating circuitry wherein each busy check OR-gate circuit is connected to all vertical rows of the respective primary stage coordinate matrix group.

15. A crosspoint-switching arrangement according to claim 14 wherein said busy check OR-gate circuits have a common output connection.

16. A crosspoint-switching arrangement according to claim 4 wherein said intermediate stage-gating circuitry includes separate and identical blocking detector networks associated with each intermediate stage coordinate matrix group.

17. A crosspoint-switching arrangement according to claim 16 wherein each said block detector network is coupled to the vertical rows of its respective intermediate stage coordinate matrix group, and is coupled to said common input of said AND-gated circuits associated with like-numbered primary stage vertical rows.

18. A crosspoint-switching arrangement according to claim 17 wherein each blocking detector network output is coupled to a different common input such that each network is coupled to a different set of said primary stage AND-gated circuits associated with like-numbered vertical rows, and that there exists an intermediate coordinate matrix group and corresponding blocking detector network for each of the sets of like-numbered primary stage vertical rows.

19. A crosspoint-switching arrangement according to claim 3 wherein said fault-determining means include differentiator circuitry coupled to said array, and check-gating circuitry coupled to said differentiator circuitry.

20. A crosspoint-switching arrangement according to claim 19 wherein said differentiator circuitry includes separate differentiating circuitry for each array stage and wherein said separate differentiating circuitry generates a pulse corresponding to an input to said gating circuitry in response to the activation of an array stage cross-point 21. A crosspoint-switching arrangement according to claim 20 wherein said separate differentiating circuitry for each array stage includes individual and identical differentiator circuits associated with each coordinate matrix group within the intermediate and secondary stages, said individual and identical differentiator circuits of a respective stage having a common output corresponding to said input to the gating circuitry.

22. A crosspoint-switching arrangement according to claim 21 wherein each said individual and identical differentiator circuit of the intermediate stage is coupled to the blocking detector network of its respective coordinate matrix group whereby the voltage change resulting from any cross-point firing within that group is sensed at the output of said blocking detector network and transferred to the gating circuitry by said differentiator circuit.

23. A crosspoint-switching arrangement according to claim 22 wherein each said individual and identical differentiator circuit of said secondary stage is operatively coupled to the vertical rows of its respective coordinate matrix group whereby each said differentiator circuit responds to a voltage change resulting from activation of a cross-point within that group by generating an output to said gating circuitry.

24. A crosspoint-switching arrangement according to claim 20 wherein said separate differentiating circuitry for each array stage further includes a primary stage differentiator circuit operatively connected to the common interconnection of said busy check OR-gate circuitry, and wherein said primary stage differentiator circuit generates an output to said gating circuitry in response to the activation of a primary stage cross-point.

25. A crosspoint-switching arrangement according to claim 19 wherein said fault-determining gating circuitry includes at least one separate check AND-gate circuit for each array stage, and wherein said check AND-gate circuits have a common input in the form of said input signal from the path selection control means.

26. A crosspoint-switching arrangement according to claim 25 wherein said at least one check AND-gate circuit associated with the primary stage is coupled to the corresponding primary stage differentiator circuit such that said check AND-gate circuit presents an output upon interrogation by said input signal from the path selection control means whenever a primary stage cross-point has fired.

27. A crosspoint-switching arrangement according to claim 25 wherein said check AND-gate circuit associated with the intermediate stage is coupled to said common output of the intermediate stage individual and identical differentiator circuits, and wherein said AND-gate circuit associated with the secondary stage is coupled to said common output of the secondary stage individual and identical differentiator circuits, such that the respective check AND-gate circuits present an output upon interrogation by said path selection control means whenever a cross-point of the respective array stage has fired.